May 18, 1926.
R. G. HANDY ET AL
GOVERNOR
Filed May 8, 1922
1,584,932
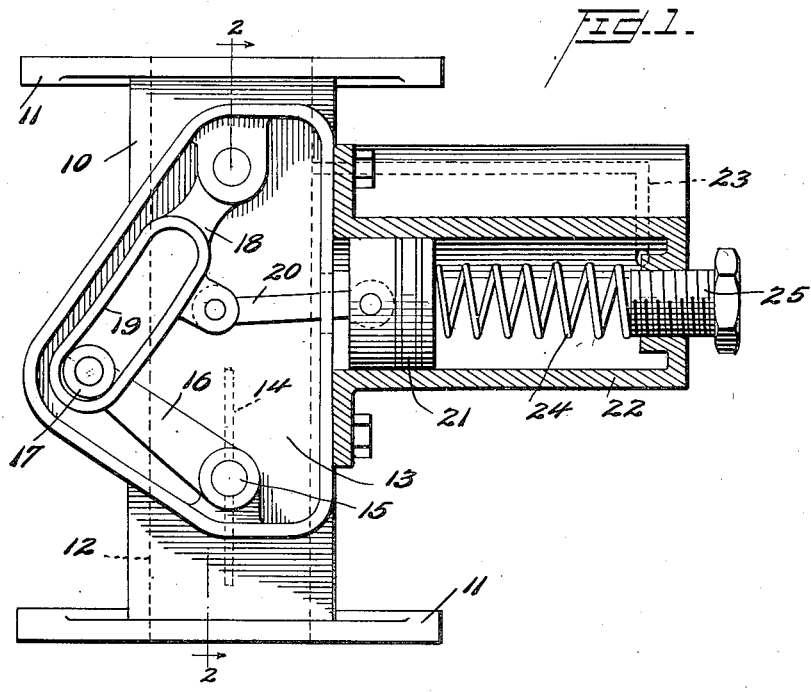
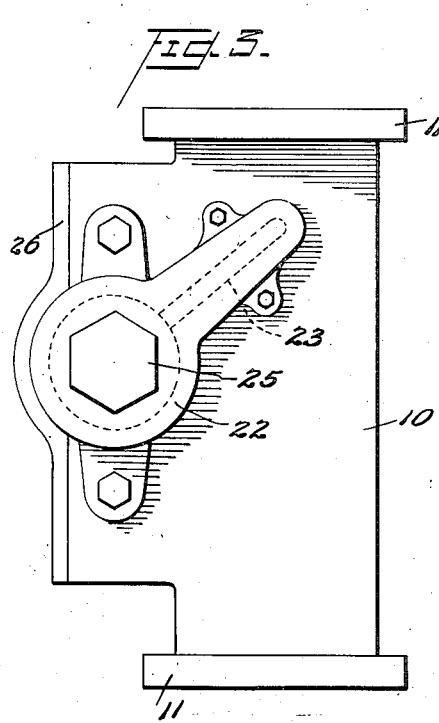
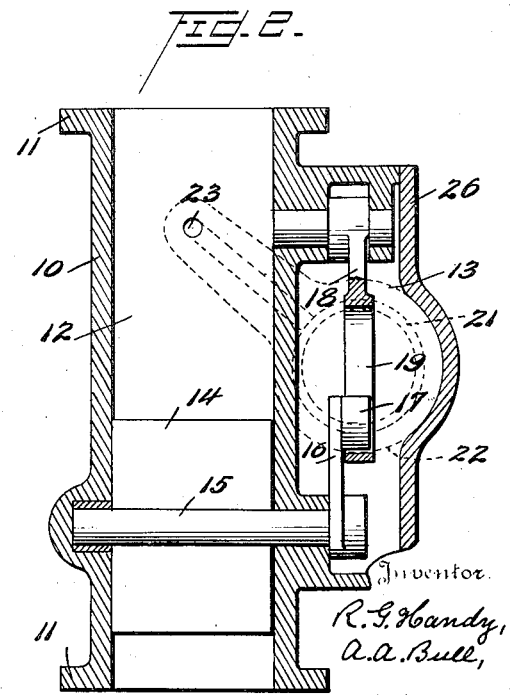
Inventor
R. G. Handy,
A. A. Bull,
By Watson, Coit, Morse & Grindle,
Attorneys.

Patented May 18, 1926.

1,584,932

UNITED STATES PATENT OFFICE.

ROBERT G. HANDY AND ARTHUR A. BULL, OF DETROIT, MICHIGAN, ASSIGNORS TO HANDY GOVERNOR CORPORATION, OF DETROIT, MICHIGAN, A CORPORATION OF MICHIGAN.

GOVERNOR.

Application filed May 8, 1922. Serial No. 559,435.

The present invention relates to governors, and more particularly to governors for hydrocarbon motors of the kind actuated by suction effects, being a species of the invention described in our application Serial No. 383,259.

If the suction effects in the intake of a hydrocarbon motor increased uniformly with the closing of the throttle valve, at constant R. P. M., the production of a satisfactory governor controlled by these effects would present no great difficulty. If this condition prevailed, a single unbalanced butterfly valve pivoted in the intake and directly connected to a spring opposing its closing movement would constitute an automatic governor which would give quite satisfactory results, if the parts were properly designed. As a matter of fact, however, a simple governor of this construction would be incapable of maintaining a constant speed under varying loads; it would at most merely establish a speed limit. This is true for the reason that the increment of pressure difference acting to move the valve towards closed position against the force of the spring, for a given displacement of the valve and for a given R. P. M., is not a constant quantity, while the increment of spring resistance for a given valve displacement is substantially constant. In short, the suction effects operating to close the valve increase at an accelerated rate as the valve moves towards closed position, at a constant R. P. M., whereas the counterbalancing force of the spring increases at a substantially constant rate. In the simple form of governor referred to, therefore, it is obvious that the spring can only balance the valve at one, or at most, two positions thereof, at any constant R. P. M., and at all other positions the valve will be unbalanced. If the governor is to maintain a constant speed under varying loads and varying valve positions, there must be some corrective means between the spring and valve, which will modify the counterbalancing force of the spring in such degree as to exactly equal the suction effects on the valve in all positions thereof when the motor is operating at the predetermined governed speed.

A suction controlled governor can be embodied in several different forms. In its simplest form the governor may consist of an unbalanced valve pivoted in the intake conduit and counterbalanced by a spring through the medium of a corrective cam mechanism. A governor of this description is disclosed in the application referred to above. In the governor described in said prior application, the valve operates as a throttling means and also as the suction responsive element of the governor. The elements of the governor have been reduced and consolidated into the fewest possible number of parts; and this form, represents probably the highest development of the suction actuated governor. However, it is desirable in some cases to use a balanced throttle valve, or a throttle valve which does not depend upon the suction effects to actuate it, and in such cases it is necessary to employ a separate suction actuated motive element for operating the valve. A governor which employs a throttle valve and a separate suction responsive member for operating the valve may take either of two forms; (1) the suction responsive member may be directly connected with the valve, so that the ratio of movement of the valve to the movement of the member is substantially constant, in which case the counterbalancing force may act on any part of the governor through the medium of a corrective mechanism; or (2) the suction responsive member may be opposed by a spring or other yielding force and said member connected with the valve through a corrective mechanism which will correlate the movements of the member and valve to give the desired governor action.

The first of the types just mentioned is described and claimed in our copending application Serial No. 559,434.

The present invention has to do with the second form. It comprises a throttle valve in the intake passage, a suction responsive member connected to the intake passage at a point between the valve and the intake manifold, a spring counterbalancing the suction effects on said member, and a connection between said member and valve including cam mechanism modifying the movement of the valve relative to the movement of the member to produce the desired governor action.

Referring to the accompanying drawings for a description of one embodiment of the present invention:—

Figure 1 is a side elevation, partly in section, of a governor constructed in accordance with this invention;

Figure 2 is a central vertical section on line 2—2 of Figure 1; and

Figure 3 is a side elevation of the governor as viewed from a position at right angles to Figure 1.

Referring to the drawings, the numeral 10 designates a hollow casting having end flanges 11, adapting it to be secured at some convenient point in the intake conduit of a hydrocarbon motor. The casting forms a conduit 12, preferably of rectangular cross section, and a chamber 13. The governor valve is preferably of the pivoted butterfly type; and, in the form illustrated, consists of a rectangular plate 14 secured along its transverse center line to a stem 15, which is pivoted in bearings formed in the walls of the conduit. The valve is therefore balanced against suction effects. As shown in Figure 2, one end of stem 15 projects into chamber 13 and has secured thereon an arm 16 which carries at its outer end a pin, on which is journaled an antifriction roller 17. It is desired that the valve move unequal amounts for equal movements of the suction responsive member. A link mechanism for this purpose is described in Patent No. 1,379,186. According to the present improvement, a cam device is employed which is much simpler and more accurate than the link mechanism. As shown, the device comprises an arm 18 pivoted in chamber 13 and having a cam slot 19 in which works the roller 17 or arm 16. A link 20 is connected at one end to a lug formed on arm 18 and at its other end to a lug on the piston 21. The piston 21 operates in a cylinder 22 bolted or otherwise attached to casting 10. The cylinder casting has formed therein a duct 23 which communicates with conduit 12 at a point located between the valve and the intake manifold and with the cylinder on one side of the piston, the other side of said piston being in free communication with the atmosphere. Movement of the piston in response to increased suction is resisted by a compression spring 24, the tension of this spring being adjustable by means of a threaded bolt 25 screwed through the end wall of the cylinder and engaging one end of the spring. The chamber 13 may be closed by means of a suitable cover plate 26.

Normally, that is when the motor is not running, no vacuum exists in the intake conduit, and consequently there is no difference of fluid pressure tending to move piston 21 to the right, as viewed in Figure 1. Hence the piston will occupy its extreme position to the left and the valve will be at its fully open position. When the motor is running the vacuum in the intake caused by the pump action of the engine pistons, is also produced in the cylinder space at the right of piston 19, and atmospheric pressure on the other side of said piston tends to cause movement thereof, against the action of the spring, towards the right as viewed in Figure 1; and through the connections described tends to cause the valve to move towards closed position. The parts are so constructed and proportioned that the valve will assume a position such as to cause the motor to run at the predetermined speed for which the governor is adjusted, the position assumed, of course, depending upon the load on the motor.

As heretofore pointed out, the vacuum in the intake increases at an accelerated rate as the valve is moved towards its closed position, with any constant R. P. M. When therefore, the suction responsive member acts in opposition to a spring or other yielding force whose resistance increases at a substantially constant rate, there must be introduced a corrective means between said suction responsive member and said valve which will correlate the movements of the suction responsive member and the valve to maintain the governed speed under varying loads. According to this invention, the corrective means employed is a cam mechanism interposed between the member and valve and operating to decelerate the closing movement of the valve with respect to the movement of the suction actuated member to effect a balance of the governor for all positions of the valve, when the engine is operating at constant speed. It has been found that a cam mechanism constitutes the most suitable known corrective means for bringing about this result. This is true for the reason that a cam mechanism can be calibrated for all positions of the governor in accordance with results obtained under actual operating conditions. In order to secure a stable and accurate governor action the corrective means employed should have this capability, as it is impossible to design from purely theoretical data any kind of corrective means which will operate to produce a perfect governor action. This results from the fact that the effort acting on the motive element of the governor is a variable which depends on the position and shape of the valve itself, the speed of the motor and the load thereon and numerous other factors, the effects whereof cannot be predetermined but are known only by actual trial, and therefore cannot be compensated except by a corrective means which permits of alteration from its theoretical design at different positions of said means. Any purely link system for compensating the various efforts on the motive element of the governor is incapable of calibration in various positions and is therefore incapable of producing a stable governor action. In the case of a cam system, however, any part of the cam surface can be readily altered from the theoretical design, and a cam contour produced which will give a perfect governor performance.

Changes may be made in the specific construction described without altering the essentials of the invention. It is obvious, for instance, that a diaphragm may be substituted for the piston, that the spring may be applied at other points than that shown, that the valve may be of a different type, etc.

Having thus described our invention what we claim as new and desire to secure by Letters Patent is:

1. In a suction responsive governor for hydrocarbon motors, in combination, a throttle valve in the intake passage, and operating means for said valve including a member responsive to the pressure in the intake passage on the cylinder side of said valve, a spring opposing movement of said member, and means connecting said member and valve including cam mechanism modifying the movement of said valve with relation to the movement of said member for the purpose of balancing the suction and spring effects on said member for any position of said valve at a predetermined speed of the motor.

2. In a suction responsive governor for hydrocarbon motors, in combination, a throttle valve in the intake passage, and operating means for said valve including a member responsive to the suction effect in the intake passage, a spring opposing movement of said member in one direction, and means including a cam device for effecting a balance of the suction and spring effects on said member at a predetermined speed of the motor.

3. In a suction responsive governor, in combination, a throttle valve in the intake passage, and operating means for said valve including a suction responsive member, yielding means opposing movement of said member, and means connecting said member and valve including cam mechanism modifying the movement of said valve with relation to the movement of said member for the purpose of balancing the suction and spring effects on said member for any position of said valve at a predetermined speed of the motor.

4. In a suction responsive governor, in combination, a throttle valve in the fuel intake passage, means forming a chamber adjacent said throttle valve, a member operating therein, said chamber communicating with the atmosphere on one side of said member and communicating on the opposite side of said member with the intake passage at a point between said valve and the intake manifold, a spring opposing movement of said member, and means connecting said member and valve including cam mechanism modifying the movement of said valve with relation to the movement of said member for the purpose of balancing the suction and spring effects on said member for any position of said valve at a predetermined speed of the motor.

5. In a suction responsive governor, in combination, a movable member controlled by suction in the intake passage, a pivoted valve in said passage, an arm rigid with the pivot of said valve, and means connecting said arm and member including cam mechanism for the purpose of balancing the forces acting on said member at a predetermined speed of said motor and all positions of said valve.

6. In a governor for hydrocarbon engines, in combination, a throttle valve in the intake passage, and operating means for said valve including a member controlled by the pressure existing in the intake passage between the valve and intake manifold, and means connecting said member and valve including cam mechanism for the purpose of balancing the forces acting on said member at a predetermined speed of said motor and all positions of said valve.

7. In a suction responsive governor for hydrocarbon motors, in combination, a member responsive to the suction in the intake manifold of the motor, a spring resisting movement of said member in one direction, and means including a cam device for balancing the suction and spring effects on said member at a predetermined speed of the motor.

8. In a suction responsive governor for hydrocarbon motors, in combination, a throttle valve in the intake passage, an operating means for said valve including a suction responsive member, yielding means opposing movement of said member in one direction, and cam mechanism modifying the movement of said valve with relation to the movement of said member for the purpose of balancing the forces acting on said member at a predetermined speed of the motor.

9. In a suction responsive governor, in combination, a member responsive to the suction in the intake manifold, yielding means resisting movement of said member in one direction, a pivoted throttle valve, an arm on said valve, a cam acting on said arm, and a link connecting said member and cam to actuate the cam, the cam being shaped to modify the movement of the valve with respect to said member for the purpose of balancing the suction and spring effects on said member at a predetermined speed of the motor.

10. In a suction responsive governor, in combination, a member responsive to the suction in the intake manifold connected to yielding means resisting its movement in one direction, a throttle valve having an arm engaging cam mechanism, said mechanism including a slotted lever and said arm having a roller engaging in the slot, a link connecting said slotted lever to the suction responsive member, whereby the leverage of said slotted member on said arm progressively increases as the valve moves towards closed position.

11. A suction responsive governor for hydrocarbon motors, including in combination, a throttle valve in the intake passage of the motor, a separate element subject to the suction in said intake, motion transmitting means connecting said valve and element, and means including a cam exactly balancing the suction effect on said element in all positions thereof when the motor is running at a predetermined governed speed.

In testimony whereof we hereunto affix our signatures.

ROBERT G. HANDY.
ARTHUR A. BULL.